United States Patent
Kovach et al.

(10) Patent No.: US 11,343,956 B2
(45) Date of Patent: May 31, 2022

(54) SYSTEM AND METHOD FOR MONITORING SOIL CONDITIONS WITHIN A FIELD

(71) Applicant: CNH Industrial Canada, Ltd., Saskatoon (CA)

(72) Inventors: Michael G. Kovach, Morton, IL (US); James W. Henry, Saskatoon (CA); Yong Deng, Peoria, IL (US)

(73) Assignee: CNH Industrial Canada, Ltd., Saskatoon (CA)

( * ) Notice: Subject to any disclaimer, the term of this patent is extended or adjusted under 35 U.S.C. 154(b) by 406 days.

(21) Appl. No.: 16/278,561

(22) Filed: Feb. 18, 2019

(65) Prior Publication Data

US 2020/0260633 A1 Aug. 20, 2020

(51) Int. Cl.
*A01B 79/00* (2006.01)
*A01B 69/00* (2006.01)
*A01B 71/02* (2006.01)

(52) U.S. Cl.
CPC .......... *A01B 79/005* (2013.01); *A01B 69/004* (2013.01); *A01B 71/02* (2013.01)

(58) Field of Classification Search
CPC ....... A01B 79/005; A01B 71/00; A01B 71/02; A01B 63/02; A01B 63/111; A01B 63/114; A01B 63/24; A01B 33/087; G05D 1/021; G05D 2201/0201
See application file for complete search history.

(56) References Cited

U.S. PATENT DOCUMENTS

| | | | |
|---|---|---|---|
| 6,041,582 A * | 3/2000 | Tiede | A01B 79/005 56/10.2 A |
| 6,070,673 A * | 6/2000 | Wendte | A01B 79/005 172/2 |
| 6,516,271 B2 | 2/2003 | Upadhyaya et al. | |
| 8,162,070 B2 | 4/2012 | Smith et al. | |

(Continued)

OTHER PUBLICATIONS

Kenshi Sakai, Bifurcation Structure of Vibrations in an Agricultural Tractor—Vibrating Subsoiler System, International Journal of Bifurcation and Chaos, 9(10), Oct. 1999, pp. 2091-2098.

(Continued)

*Primary Examiner* — Jessica H Lutz
(74) *Attorney, Agent, or Firm* — Rebecca L. Henkel; Rickard K. DeMille

(57) ABSTRACT

A system for monitoring soil conditions within a field includes an agricultural implement including a frame and a ground-engaging tool coupled to the frame. The system further includes a first sensor coupled to the ground-engaging tool and configured to detect motion of the ground-engaging tool as the agricultural implement is moved across the field. The system additionally includes a second sensor separate from the first sensor. The second sensor is configured to detect an orientation of the ground-engaging tool relative to the frame as the agricultural implement is moved across the field. The system includes a controller communicatively coupled to the first and second sensors. The controller is configured to determine an indication of a soil condition at a given location within the field based at least in part on the detected motion and the detected orientation of the ground-engaging tool at the given location within the field.

18 Claims, 8 Drawing Sheets

(56) References Cited

U.S. PATENT DOCUMENTS

| | | | | |
|---|---|---|---|---|
| 8,573,319 | B1* | 11/2013 | Casper | A01B 63/114 |
| | | | | 172/4 |
| 8,827,001 | B2* | 9/2014 | Wendte | A01B 63/008 |
| | | | | 172/4 |
| 9,144,189 | B2 | 9/2015 | Stoller et al. | |
| 9,213,905 | B2* | 12/2015 | Lange | G06K 9/00805 |
| 9,485,900 | B2* | 11/2016 | Connell | A01B 21/08 |
| 9,511,633 | B2* | 12/2016 | Anderson | A01B 79/005 |
| 9,664,249 | B2* | 5/2017 | Kowalchuk | F16F 15/02 |
| 9,668,420 | B2 | 6/2017 | Anderson et al. | |
| 9,699,958 | B2* | 7/2017 | Koch | A01C 21/005 |
| 9,826,677 | B2* | 11/2017 | Gervais | A01C 7/205 |
| 9,880,535 | B2 | 1/2018 | Henry | |
| 9,980,422 | B2* | 5/2018 | Czapka | A01B 59/042 |
| 9,989,986 | B2 | 6/2018 | Foster et al. | |
| 10,080,323 | B2* | 9/2018 | Lund | A01B 63/008 |
| 2008/0195268 | A1 | 8/2008 | Sapilewski et al. | |
| 2012/0125244 | A1* | 5/2012 | Beaujot | A01B 79/005 |
| | | | | 111/149 |
| 2013/0046439 | A1* | 2/2013 | Anderson | B60C 23/002 |
| | | | | 701/36 |
| 2013/0046446 | A1* | 2/2013 | Anderson | B60T 8/1755 |
| | | | | 701/50 |
| 2013/0054078 | A1* | 2/2013 | Anderson | B60C 23/002 |
| | | | | 701/29.1 |
| 2015/0257328 | A1 | 9/2015 | Pieralisi et al. | |
| 2016/0071410 | A1 | 3/2016 | Rupp et al. | |
| 2017/0094894 | A1* | 4/2017 | Heim | A01C 21/005 |
| 2018/0042171 | A1* | 2/2018 | Maro | A01C 7/205 |
| 2018/0092295 | A1* | 4/2018 | Sugumaran | A01C 23/007 |
| 2018/0114305 | A1* | 4/2018 | Strnad | G01N 33/24 |
| 2018/0139892 | A1* | 5/2018 | Knobloch | A01B 19/04 |
| 2018/0168094 | A1* | 6/2018 | Koch | A01C 7/203 |
| 2018/0206387 | A1* | 7/2018 | Stark | A01B 63/111 |
| 2018/0239360 | A1* | 8/2018 | Valberg | G05D 1/0223 |
| 2018/0242517 | A1* | 8/2018 | Davis | G01S 19/42 |
| 2018/0279543 | A1* | 10/2018 | Kovach | A01B 63/008 |
| 2018/0325010 | A1* | 11/2018 | Connell | A01C 5/08 |
| 2019/0235529 | A1* | 8/2019 | Barrick | G05D 1/0891 |
| 2019/0246548 | A1* | 8/2019 | Kovach | A01B 3/24 |
| 2019/0254222 | A1* | 8/2019 | Rhodes | A01C 7/107 |
| 2019/0254223 | A1* | 8/2019 | Eichhorn | A01C 7/203 |
| 2020/0000005 | A1* | 1/2020 | Stanhope | A01B 35/26 |
| 2020/0045871 | A1* | 2/2020 | Czapka | A01B 63/14 |
| 2020/0068783 | A1* | 3/2020 | Strnad | A01B 76/00 |
| 2020/0084954 | A1* | 3/2020 | Sporrer | A01B 63/32 |
| 2020/0260633 | A1* | 8/2020 | Kovach | A01B 71/02 |
| 2020/0260634 | A1* | 8/2020 | Kovach | G05D 1/021 |
| 2020/0337204 | A1* | 10/2020 | Hertzog | A01B 63/111 |
| 2020/0390018 | A1* | 12/2020 | Smith | A01B 61/046 |
| 2020/0404837 | A1* | 12/2020 | Thompson | A01C 7/203 |
| 2021/0007277 | A1* | 1/2021 | Anderson | A01B 76/00 |
| 2021/0041875 | A1* | 2/2021 | Nishiyama | G05D 1/021 |
| 2021/0059094 | A1* | 3/2021 | Barrick | A01B 63/1112 |
| 2021/0059095 | A1* | 3/2021 | Sloneker | A01B 63/30 |
| 2021/0068331 | A1* | 3/2021 | Sporrer | A01B 63/16 |

OTHER PUBLICATIONS

R. Karoonboonyanan, Vibration Effects on the Performance of a Single-Shank Subsoiler, Agricultural Engineering International: the CIGR Ejournal, Manuscript PM 07 018 vol. IX, Sep. 2007.

R. Fanigliulo, Different Aspects of the Utilization of a Subsoiler equipped with an Horizontal Device for Soil Disruption, CRA-ING Agricultural Research Council, http://journals.sfu.ca/cigrp/index.php/Proc/article/viewFile/105/104, Sep. 2009.

* cited by examiner

US 11,343,956 B2

SYSTEM AND METHOD FOR MONITORING SOIL CONDITIONS WITHIN A FIELD

FIELD OF THE INVENTION

The present disclosure generally relates to agricultural implements and, more particularly, to systems and methods for monitoring soil conditions within a field, such as the condition of the seedbed floor, utilizing inputs from a combination of sensors or sensing devices.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotally coupled to a frame of the tillage implement. Tillage implements may also include biasing elements, such as springs, configured to exert biasing forces on the ground-engaging tools. This configuration may allow the ground-engaging tools to maintain the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

When performing a tillage operation, it is desirable to create a level and uniform layer of tilled soil across the field to form a proper seedbed for subsequent planting operations. However, ground-engaging tools that have pivoted or moved in order to prevent damage to the ground-engaging tools may not create a level seedbed floor suitable for planting operations. Further, it may be difficult for the tillage implement operator to determine the levelness of the seedbed floor while performing a tillage operation.

Accordingly, an improved system and method for monitoring soil conditions, such as the condition (e.g., levelness or roughness) of the seedbed floor associated with a field across which an agricultural implement is being moved, would be welcomed in the technology.

BRIEF DESCRIPTION OF THE INVENTION

Aspects and advantages of the technology will be set forth in part in the following description, or may be obvious from the description, or may be learned through practice of the technology.

In one aspect, the present subject matter is directed to a system for monitoring soil conditions within a field. The system includes an agricultural implement including a frame and a ground-engaging tool coupled to the frame. The system further includes a first sensor coupled to the ground-engaging tool and configured to detect motion of the ground-engaging tool as the agricultural implement is moved across the field. The system additionally includes a second sensor separate from the first sensor. Moreover, the second sensor is configured to detect an orientation of the ground-engaging tool relative to the frame as the agricultural implement is moved across the field. The system further includes a controller communicatively coupled to the first and second sensors. The controller is configured to determine an indication of a soil condition at a given location within the field based at least in part on the detected motion and the detected orientation of the ground-engaging tool at the given location within the field.

In another aspect, the present subject matter is directed to a method of monitoring soil conditions within a field. The method includes monitoring, with a computing device, a motion of a ground-engaging tool of an agricultural implement as the agricultural implement is moved across the field based on data received from a first sensor coupled to the ground-engaging tool. In addition, the method includes monitoring, with the computing device, an orientation of the ground-engaging tool relative to a frame of the agricultural implement as the agricultural implement is moved across the field based on data received from a second sensor that is separate from the first sensor. Further, the method includes determining, with the computing device, an indication of a soil condition at a given location within the field based at least in part on the motion and the orientation of the ground-engaging tool at the given location within the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
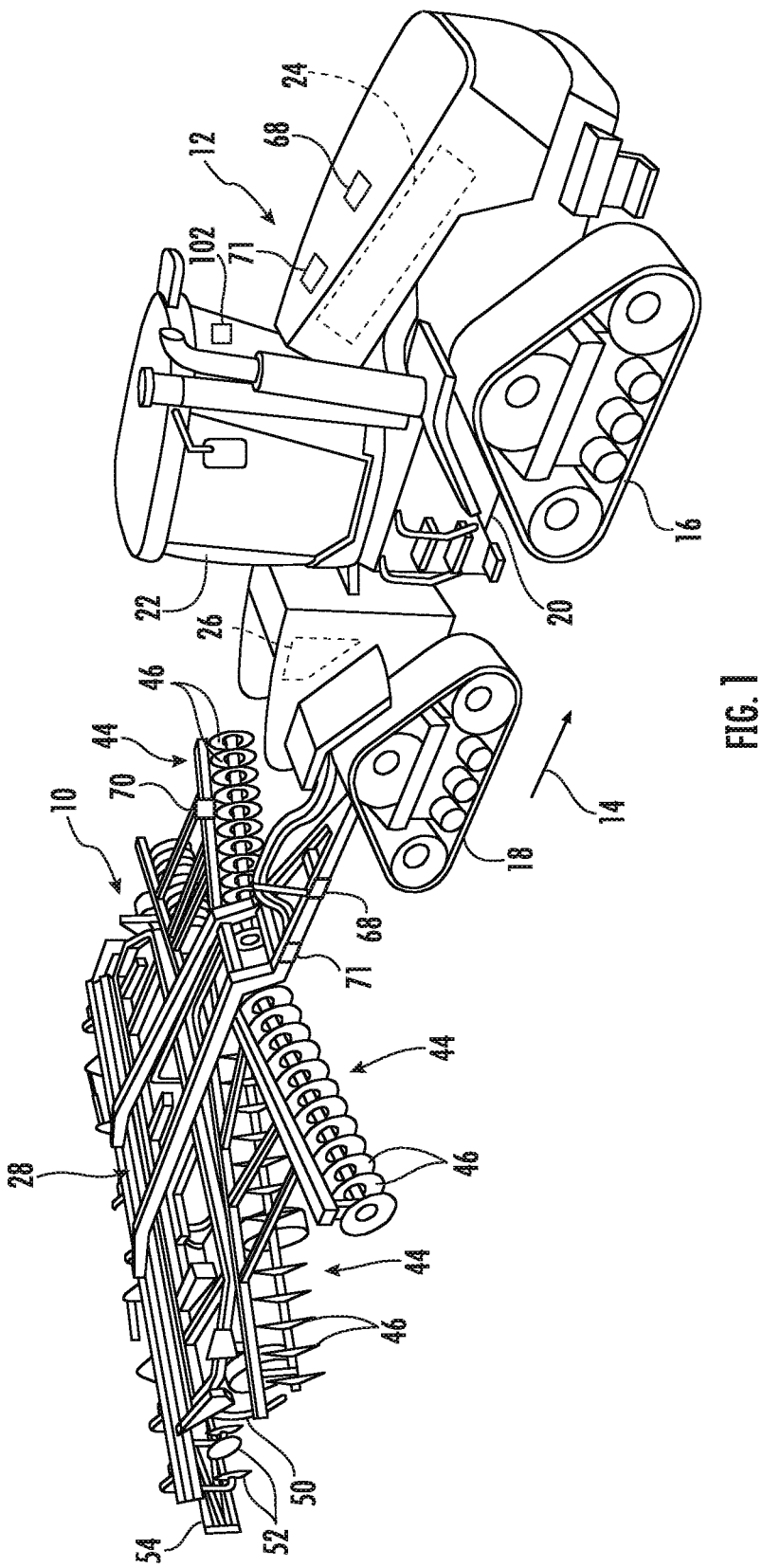
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring soil conditions within a field. In several embodiments, a controller of the disclosed system may be configured to receive measurement signals or other data from a combination of difference sensors (e.g., two or more sensors) as the implement is being moved across a field. For example, in accordance with aspects of the present subject matter, the disclosed system may include both a first sensor configured to detect motion of a ground-engaging tool of the implement (e.g., motion of the tool independent of the frame) and a second sensor configured to detect a relative orientation of the ground-engaging tool (e.g., the tool orientation relative to the frame and/or a toolbar coupled to the frame). As will be described below, the controller may be configured to determine or estimate a soil condition associated with the field, such as a seedbed floor condition, based at least in part on the measurement signals received from the sensors. For instance, the controller may be configured to apply a sensor fusion algorithm or may otherwise analyze the motion/orientation data received from the sensor to determine the levelness or roughness of the seedbed floor as the implement is being moved across the field. In addition, the controller may also be configured to generate a visual indicator of the monitored soil condition for display to the operator, such as by generating a display element or interface element for presentation within a user interface displayed to the operator or by generating a field map with geographical coordinates for display that maps the monitored soil condition relative to the field.

Figure 2:
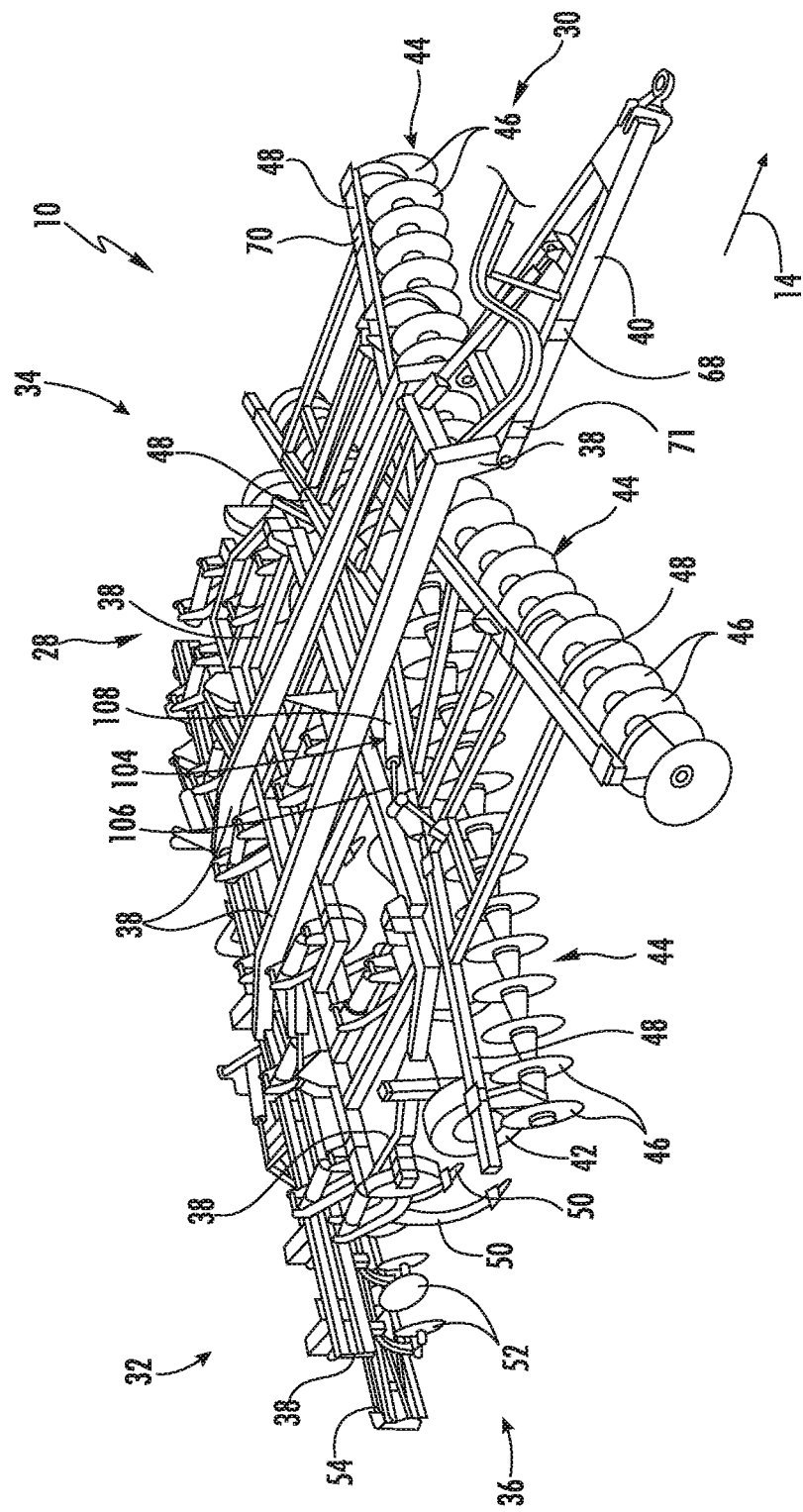
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14. As further illustrated, at least one of work vehicle 12 or the implement 10 may include a sensor 71 configured to provide data indicative of a speed of the agricultural implement 10 as the agricultural implement 10 is moved across the field, such as a ground speed sensor providing data indicative of the ground speed of the implement 10 and/or the work vehicle 12. As shown particularly in FIG. 1, at least one of work vehicle 12 or the implement 10 may include a sensor 68 configured to provide data indicative of a location of the agricultural implement 10 as the agricultural implement 10 is moved across the field, such as a global positioning system (GPS) sensor providing data indicative of the location of agricultural implement and/or the work vehicle 12.

In several embodiments, one or more ground-engaging tools may be coupled to and/or supported by the frame 28. In such embodiments, the ground-engaging tool(s) may, for example, include one or more ground-penetrating tools. More particularly, in certain embodiments, the ground-engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32.

Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
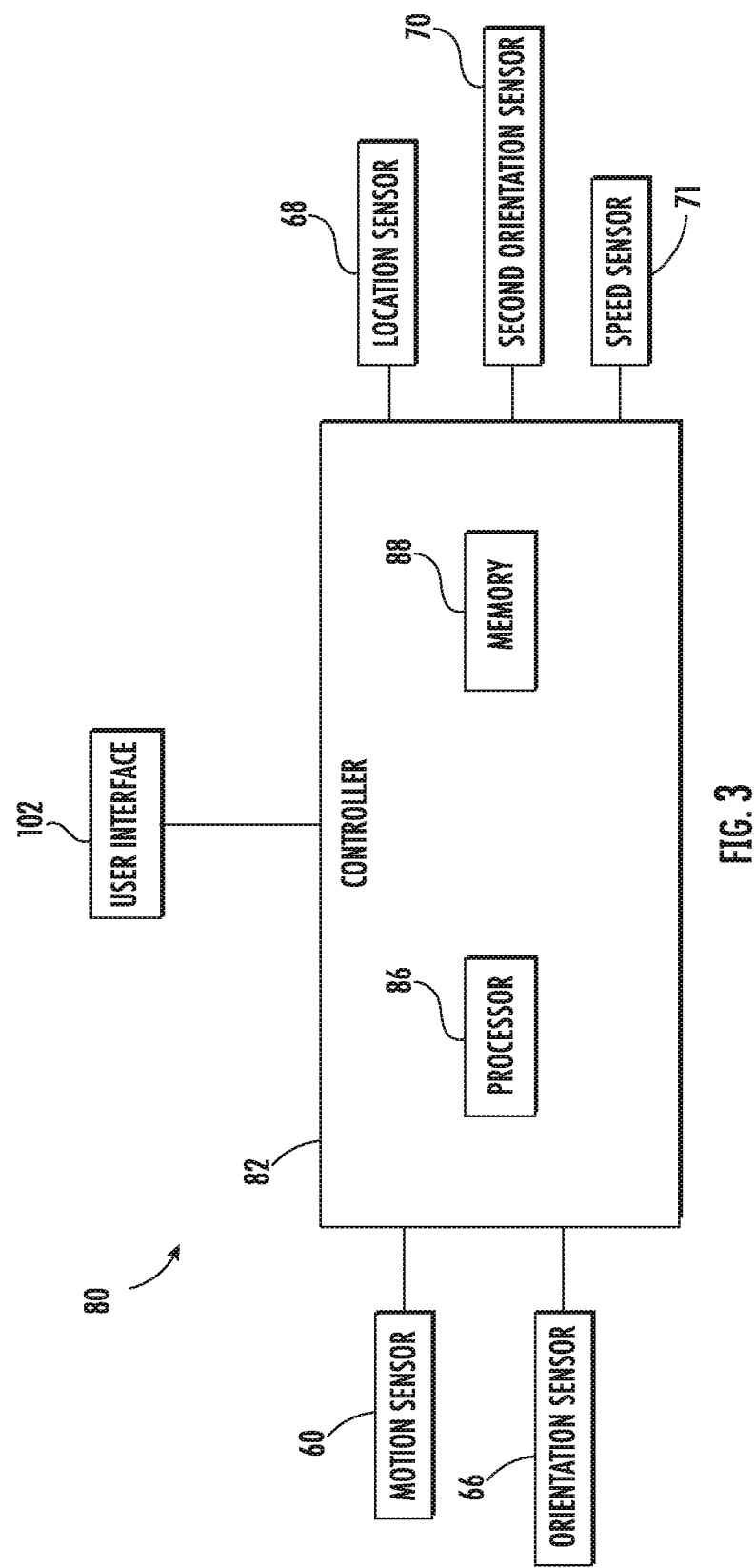
FIG. 3 illustrates a schematic view of one embodiment of a system for monitoring a soil condition within a field in accordance with aspects of the present subject matter.

Referring now to FIG. 3, a schematic view of one embodiment of a system 80 for monitoring soil conditions associated with a field is illustrated in accordance with aspects of the present subject matter. In general, the system 80 will be described herein with reference to the embodiment of the implement 10 described above with reference to FIGS. 1 and 2. However, it should be appreciated that, in general, the disclosed system 80 may generally be utilized with any suitable implement having any suitable implement configuration to allow a soil condition of the field being worked to be monitored.

As shown, the system 80 may generally include a controller 82 configured to be communicatively coupled to a plurality of sensors 60, 66, 68, 70, 71 for monitoring one or more operating parameters associated with the implement 10. Specifically, in the illustrated embodiment, the controller 82 is coupled to one or more motion sensors 60 configured to detect the motion of one or more of the ground-engaging tools of the implement 10 as the implement 10 is being moved across a field. For instance, as will be described below, the motion sensor(s) 60 may be mounted directly to a portion of one or more ground-engaging tools of the implement (e.g., a portion of one or more shanks 50 and/or one or more disc gang assemblies 44) to allow motion data associated with the movement of the tool(s) (e.g., acceleration or vibration data) to be captured. In addition, as shown in FIG. 3, the controller 82 is coupled to one or more orientation sensors 66, 70 configured to detect the orientation of such ground-engaging tool(s) relative to another component of the implement 10 (e.g., the frame 28 of the implement 10) and/or relative to the ground. For example, the orientation sensor(s) 66, 70 may allow the relative orientation of one or more of the ground-engaging tools to be continuously monitored as the implement 10 is being moved across a field.

As will be described below, by capturing both motion data and orientation data associated with a given ground-engaging tool of the implement 10, the controller 82 may be configured to estimate or determine a soil condition associated with the field as the implement 10 is moved across such field. For instance, in several embodiments, the motion/orientation data received from the sensors 60, 66, 70 may be analyzed to provide an indication of a seedbed floor condition for the field (also referred to herein as the "seedbed quality"), such as the roughness or the levelness of the seedbed floor. Specifically, for a given location within the field, the motion/orientation data may provide a snapshot of both the independent motion of the ground-engaging tool(s) (e.g., the acceleration and/or vibration of the tool(s) as the tool(s) engages the ground during formation of the seedbed and the change in orientation of the tool(s) as it moves relative to the ground across such location). A direct correlation can then be established between the motion/orientation data and the seedbed quality. For example, a lower quality seedbed floor (e.g., a seedbed floor with high roughness) will generally result in increased independent acceleration/vibration of the tool(s) and/or an increase in the rate at which the monitored orientation of the tool(s) changes. Similarly, a higher quality seedbed floor (e.g., a substantially level seedbed floor) will generally result in reduced independent acceleration/vibration of the tool(s) and/or a reduction in the rate at which the monitored orientation of the tool(s) changes. The specific correlation between the motion/orientation data and the seedbed quality may, for example, be determined experimentally and/or mathematically and subsequently expressed as a mathematical expression, a look-up table, and/or the like. For instance, a look-up table may be developed that correlates the magnitude of the acceleration/vibration data and the rate of change of the orientation data to a given seedbed quality metric or indicator (e.g., a seedbed quality percentage ranging from 0% to 100%/o). In addition, a suitable data fusion or sensor fusion algorithm may be utilized to analyze the data received from the sensors 60, 66, 70 with the output of such algorithm being used to estimate or determine the seedbed quality (e.g., by using the output as an input into a related mathematical expression and/or look-up table).

Additionally, in several embodiments, the correlation established between the motion/orientation data and the seedbed quality or other field condition being monitored may also take into account the speed at which the implement 10 is being moved across the field. For instance, for a given seedbed quality, the magnitude of the acceleration/vibration data and/or the rate of change of the orientation data may vary based on the ground speed of the implement 10. As an example, the shanks 50 of the implement 10 may experience higher accelerations/vibrations while the implement is being moved across the field at 6 miles-per-hour (MPH) than when the implement 10 is being moved across the field at 4 MPH despite the shanks 50 being exposed to the exact same seedbed quality. In this regard, the controller 82 may also be coupled to a suitable speed sensor, such as the speed sensor(s) 71 described above with reference to FIGS. 1 and 2, to allow the controller 82 to monitor the ground speed of the implement 10. This speed data may then be used when interpreting the motion/orientation data received from the other sensors 60, 66, 70. For instance, in one embodiment, separate mathematical expressions or look-up tables may be established for correlating the motion/orientation data to the seedbed quality at differing ground speeds, such as by establishing a separate mathematical expression or look-up table for each of a plurality of incremental ground speeds (e.g., at each speed defined between 0 MPH and 10 MPH in increments of 0.1 MPH).

Further, in certain embodiments, the correlation between the motion/orientation data and the seedbed quality or other field condition being monitored may be stored for one or more locations as the implement 10 is being moved across the field. For example, location data may be associated with each combination of motion/orientation/speed data and/or the seedbed quality or other field condition. Further, such data or combination of data may be stored within the memory device(s) 88. In this regard, the controller 82 may also be coupled to a suitable location sensor, such as the location sensor(s) 68 described above in regards to FIGS. 1 and 2, to allow the controller 82 to store the data from the sensor(s) 60, 66, 70, 71 or the field condition/seedbed quality for one or more locations within the field, such as for each location within the field. Further, as will be described in more detail below in regards to FIG. 7, the location data from the location sensor(s) 68 may allow for the creation of a field map with geographical coordinates illustrating the seedbed quality and/or field condition at one or more locations within the field.

In general, the controller 82 may comprise any suitable processor-based device known in the art, such as a computing device or any suitable combination of computing devices. Thus, in several embodiments, the controller 82 may include one or more processor(s) 86 and associated memory device(s) 88 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 88 of the controller 82 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 88 may generally be configured to store suitable computer-readable instructions that, when implemented by the processor(s) 86, configure the controller 82 to perform various computer-implemented functions, such as one or more aspects of the method 200 described below with reference to FIG. 8 and/or the method 300 described below with reference to FIG. 9. In addition, the controller 82 may also include various other suitable components, such as a communications circuit or module, one or more input/output channels, a data/control bus and/or the like.

It should be appreciated that the controller 82 may correspond to an existing controller of the implement 10 or the work vehicle 12 or the controller 82 may correspond to a separate processing device. For instance, in one embodiment, the controller 82 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

As shown in FIG. 3, the system 80 may also include a user interface 102 communicatively coupled to the controller 82. In one embodiment, the user interface 102 may be configured to provide feedback (e.g., notifications associated with the soil condition being monitored) to the operator of the implement 10. As such, the user interface 102 may include or be associated with one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the operator's cab 22 of the work vehicle 12. However, in alternative embodiments, the user interface 102 may have any suitable configuration and/or be positioned in any other suitable location.

It should be appreciated that each motion sensor 60 of the disclosed system 80 may generally correspond to any suitable sensor configured to provide an indication of the motion of a respective tool(s) of the implement 10. For instance, in several embodiments, each motion sensor 60 may correspond to an accelerometer, such as a single-axis, two-axis, or three-axis accelerometer, configured to detect the acceleration and/or vibration of a respective tool(s) as the tool(s) engages the ground. In this regard, each motion sensor 60 may, in one embodiment, be configured to monitor the motion of its respective tool(s) independent of the frame of the implement 10, thereby allowing the sensor 60 to provide an indication of the independent movement of the tool(s) as it engages the seedbed floor. However, in other embodiments, each motion sensor 60 may correspond to any other suitable sensor configured to provide motion data associated with its respective tool(s).

It should also be appreciated that each orientation sensor 66, 70 of the disclosed system 80 may generally correspond to any suitable sensor configured to provide an indication of the orientation of a respective tool(s) of the implement 10, relative to another component of the implement 10 (e.g., the frame 28), and/or relative to the ground. For instance, in several embodiments, each orientation sensor 66, 70 may correspond to a rotary sensor (e.g., a rotary potentiometer, a rotary encoder, and/or the like) coupled between the tool(s) and the implement frame 28 to monitor the orientation or position of the tool(s) relative to the frame 28. In another embodiment, each orientation sensor 66, 70 may correspond to a gyroscope configured to detect the orientation of the tool(s) relative to a given reference point on the implement frame 28 and/or relative to the ground. However, in other embodiments, each orientation sensor 66, 70 may correspond to any other suitable sensor configured to provide orientation data associated with its respective tool(s). For instance, one or both of the orientations sensors 66, 70 may correspond to an inertia motion unit (IMU) configured to detect the orientation of the tool(s) relative to the given reference point on the implement frame 28 and/or relative to the ground.

Figure 4:
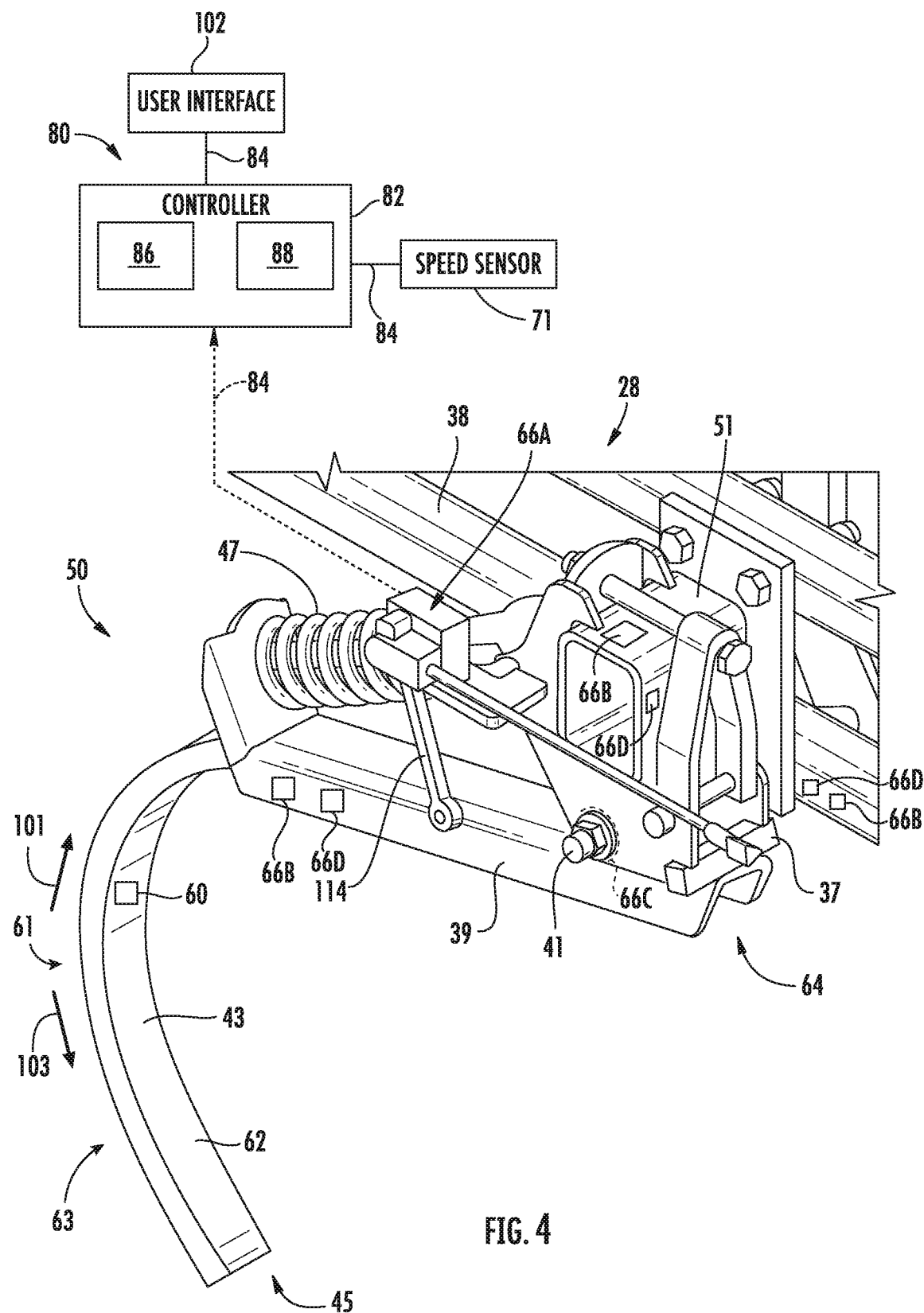
FIG. 4 illustrates a partial perspective view of one example implementation of the system of FIG. 3 in accordance with aspects of the present subject matter, particularly illustrating aspects of the disclosed system provided in association with a ground-engaging tool (e.g., a shank) of an agricultural implement.

Referring now to FIG. 4, a particular embodiment of the system 80 described above with reference to FIG. 3 is illustrated in accordance with aspects of the present subject matter. Specifically, FIG. 4 illustrates a perspective view of various components of the disclosed system 80 installed relative to one of the shanks 50 of the implement 10 above with reference to FIGS. 1 and 2. However, it should be appreciated that the aspects of the system 80 described herein with reference to FIG. 4 may also be utilized with any other suitable ground-engaging tools of a given agricultural implement.

As shown in FIG. 4, the system 80 may include a shank 50 pivotally coupled to the implement frame 28. In the illustrated embodiment, the shank 50 includes both an attachment portion 39 configured to be pivotally coupled to the frame 28 (e.g., at pivot point 41) and a ground-engaging portion 43 extending from the attachment portion 39 along a curved or arcuate profile. As shown in FIG. 4, the ground-engaging portion 43 may include a tip end 45 that is configured to penetrate into or otherwise engage the ground as the implement 10 is being pulled through the field. In one embodiment, the shank 50 may be configured as a chisel. However, one of ordinary skill in the art would appreciate that the ground engaging tool may be configured as a sweep, tine, or any other suitable ground engaging tool. It should also be appreciated an auxiliary attachment may also be coupled to the shank 50 at its tip end 45, such as a point attachment.

As shown in FIG. 4, in several embodiments, a biasing element 47 may be coupled between the frame 28 and the shank 50 to bias the shank 50 to a predetermined ground-engaging tool position (e.g., a home or base position) relative to the frame 28. In general, the predetermined ground-engaging tool position may correspond to a ground-engaging tool position in which the shank 50 penetrates the soil to a desired depth. In several embodiments, the predetermined ground-engaging tool position may be set by a mechanical stop 37. In operation, the biasing element 47 may permit relative movement between the shank 50 and the frame 28. For example, the biasing element 47 may be configured to bias the shank 50 to pivot relative to the frame 28 in a first pivot direction (e.g., as indicated by arrow 103 in FIG. 4) until an end 64 of the shank 50 contacts the stop 37. The biasing element 47 may also allow the shank 50 to pivot away from the predetermined ground-engaging tool position (e.g., to a shallower depth of penetration), such as in a second pivot direction (e.g., as indicated by arrow 101 in FIG. 4) opposite the first pivot direction 103, when encountering rocks or other impediments in the field. As shown in FIG. 4, the biasing element 47 may be configured as a spring. It should be recognized, however, the biasing element 47 may be configured as an actuator or any other suitable biasing element.

Additionally, in accordance with aspects of the present subject matter, the system 80 may include one or more motion sensors 60 configured to detect the motion of the shank 50 as the implement 10 is being moved across the field and transmit associated motion data to the corresponding system controller 82. As indicated above, the motion sensor(s) 60 may be configured to detect the motion of the shank 50. For example, the motion sensor(s) 60 may correspond to an accelerometer configured to detect the acceleration or vibration of the shank 50 as it is being pulled through the ground. Additionally, in one embodiment, the motion sensor(s) 60 may be configured to detect the motion of the shank 50 independent from the frame 28 of the implement 10. For instance, the motion sensor(s) 60 may be configured to detect local accelerations and/or vibrations of the shank 50 that are not transmitted to frame 28 or that do not otherwise result in similar acceleration/vibration of the frame 28.

As shown in FIG. 4, the motion sensor(s) 60 may, in one embodiment, be mounted directly to a portion of the shank 50. For instance, in the illustrated embodiment, the motion sensor(s) 60 is mounted directly to the ground-engaging portion 43 of the shank 50 at a location between the attachment portion 39 of the shank 50 and the tip end 45 of the shank 50. In such an embodiment, it may be desirable to mount the motion sensor(s) 60 at the location at which the curved or arcuate ground-engaging portion 43 of the shank 50 defines its maximum curvature (i.e., the maximum curvature location 61) along the length of the shank 50. It should be appreciated that the shank 50 may define a variable radius between the tip end 45 and the end 64 of the shank. Further, a location(s) of the minimum radius of the variable radius may define the maximum curvature location(s) 61. As such, the sensor(s) 60 may be coupled at the locations(s) of the minimum radius of the shank 50 (i.e. the maximum curvature location(s) 61). However, in other embodiments, the motion sensor(s) 60 may be mounted to the shank 50 at any other suitable location along the length of the shank. It should also be appreciated that, although the sensor(s) 60 is illustrated as being positioned on a concave side 62 of the shank 50, the sensor(s) 60 may alternatively be coupled to the opposed convex side 63 of the shank 50.

Moreover, as indicated above, the system 80 may also include one or more orientation sensors 66 configured to detect the relative orientation of the shank 50, such as the orientation of the shank 50 relative to the implement frame 28 and/or the orientation of the shank 50 relative to any other suitable reference location (e.g., the ground) and transmit associated orientation data to the corresponding system controller 82. For example, FIG. 4 illustrates various examples of different optional orientation sensors 66 (e.g., sensors 66A, 66B, 66C) that may be used to monitor the relative orientation of the shank 50. Thus, it should be appreciated that the system 80 need not include each of the orientation sensors 66 shown in FIG. 4. For instance, embodiments of the disclosed system 80 may only include one of the orientation sensors 66 described with reference to FIG. 4 to monitor the relative orientation of the shank 50.

As shown in FIG. 4, in one embodiment, the system 80 may include an orientation sensor 66 configured as a rotary sensor 66A (e.g., a rotary potentiometer or a magnetic rotary sensor) configured to detect the orientation of the shank 50 relative to the frame 28 based on the movement of a mechanical linkage(s) coupled between the frame 28 and the shank 50. Specifically, in the illustrated embodiment, the rotary sensor 66A is coupled to a portion of the frame 28 while an associated sensor linkage 114 is coupled between the rotary sensor 66A and the shank 50 (e.g., the attachment portion 39 of the shank 50). As such, when the shank 50 pivots relative to the frame 28, the pivoting motion of the shank 50 may be detected by the rotary sensor 66A via the mechanical linkage provided by the sensor linkage 114.

Such detected motion may then be used to determine the position or orientation of the shank 50 relative to the frame 28.

Additionally, as another example, the orientation sensor 66 may be configured as one or more gyroscopes 66B coupled to the shank 50, a portion of the frame 28, and/or a toolbar 51 coupled between the shank 50 and the frame 28. For instance, as shown in FIG. 4, a gyroscope 66B may be coupled to the shank 50 (e.g., the attachment portion 39 of the shank 50) to allow the orientation of the shank 50 to be monitored. In such an embodiment, the shank-mounted gyroscope 66B may allow for orientation of the shank 50 to be monitored relative to a predetermined reference orientation defined independent of the implement frame 28, such as an orientation defined relative to the direction of gravity. In addition to monitoring the shank 50 orientation relative to the predetermined reference orientation, the shank-mounted gyroscope 66B may also allow the relative orientation between the shank 50 and the frame 28 to be monitored. For instance, as shown in FIG. 4, a separate gyroscope 66B may also be mounted to a portion of the frame 28. In such an embodiment, by monitoring the orientation data provided by both the shank-mounted gyroscope 66B and the frame-mounted gyroscope 66B, the controller 82 may be configured to determine the orientation of the shank 50 relative to the frame 28. Further, the toolbar mounted gyroscope 66B may allow for the orientation of the shank 50 to be monitored relative the toolbar 51. In another embodiment, the toolbar-mounted gyroscope 66B in combination with the frame-mounted gyroscope 66B may allow the controller 82 to determine the orientation of the toolbar 51 relative to the frame 28.

As a further example, the orientation sensor 66 may be configured as one or more inertia motion units (IMOs) 66D. Generally the IMO(s) 66D may be coupled at any position the gyroscope(s) 66B described above may be coupled. For instance, one or more IMOs 66D may be coupled to the shank 50, a portion of the frame 28, and/or the toolbar 51. As such, the IMO(s) 66D may allow the relative orientation between the shank 50 and the frame 28 to be monitored relative to the predetermined reference orientation defined independent of the implement frame 28, the orientation of the shank 50 to be monitored relative to the frame 28, the orientation of the shank 50 to be monitored relative the toolbar 51, and/or the orientation of the toolbar 51 to be monitored relative to the frame 28. Further, it should be appreciated that one or more gyroscope 66C and one or more IMOs 66D may be used in combination to determine the relative orientation between the shank 50, the predetermined reference orientation, the frame 28, and/or the toolbar 51.

As yet another example, as shown in FIG. 4, the orientation sensor(s) 66 may be configured as a rotary encoder 66C configured to be positioned at the pivot point 41 defined between the shank 50 and the frame 28 and/or the toolbar 51 to allow the relative orientation between such components to the monitored. In such an embodiment, the rotary encoder 66C may be configured to detect the amount of pivotal motion between the shank 50 and the frame 28 and/or toolbar 51 at the pivot point 41, which may then be used to determine the orientation of the shank 50 relative to the frame 28.

When executing the embodiment of the system 80 shown in FIG. 4, the controller 82 may be configured to determine an indication of the seedbed quality at a given location within the field based on the detected motion of the shank 50 communicated from the motion sensor(s) 60 and the detected relative orientation of the shank 50 communicated from by the orientation sensors(s) 66 (via communicative link(s) 84 omitted for clarity) as the implement 10 is being moved across the field. Additionally, as indicated above, in one embodiment, the controller 82 may be configured to further determine the indication of the seedbed quality at the given location within the field based on the speed of the agricultural implement 10. For example, a speed sensor(s) 71 (see, FIGS. 1 and 2) may communicate data indicative of the speed of the agricultural implement 10 at the given location within the field. The controller 82 may then utilize the data derived from the sensors 60, 66, 71 (e.g., the detected motion of the shank 50, the detected relative orientation of the shank 50 to the ground and/or the frame 28 of the implement 10, and/or the speed of the agricultural implement 10) as inputs into a mathematical expression, a look-up table, and/or the like as described above with reference to FIG. 3 to allow the seedbed quality to be monitored.

Figure 5:
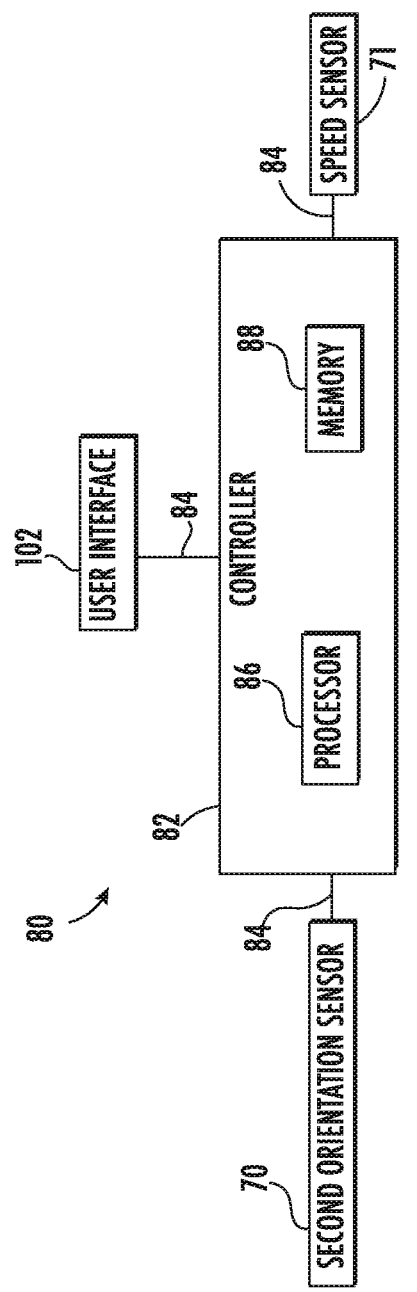
FIG. 5 illustrates a perspective view of another example implementation of the system of FIG. 3 in accordance with aspects of the present subject matter, particularly illustrating aspects of the disclosed system in association with a ganged tool assembly (e.g., a disc gang assembly) of an agricultural implement.
Figure 5:
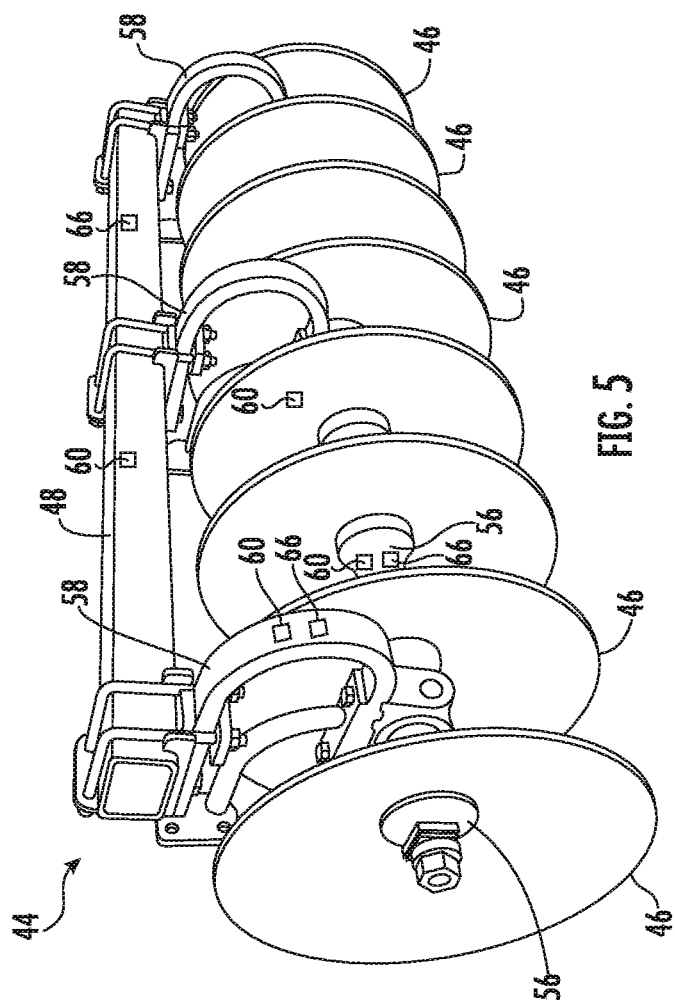

Referring now to FIG. 5, another example implementation of the system 80 described above with reference to FIG. 3 is illustrated in accordance with aspects of the present subject matter. Specifically, FIG. 5 illustrates a perspective view of various components of the disclosed system 80 installed relative to one of the disc gang assemblies 44 of the implement 10 described above with reference to FIGS. 1 and 2. However, it should be appreciated that the aspects of the system 80 described herein with reference to FIG. 5 may also be utilized with any other ganged tool assembly including any other suitable ground-engaging tools of a given agricultural implement 10.

As shown in FIG. 5, the disc gang assembly 44 may include a plurality of disc blades 46 rotatably coupled to and spaced apart along the length of a disc gang shaft 56. The disc gang shaft 56 may, in turn, be positioned underneath and coupled to the toolbar 48 of the disc gang assembly 44 via one or more hangers 58 of the disc gang assembly 44. For example, in the illustrated embodiment, the hangers 58 define a C-shape that permits the disc gang shaft 56 and the disc blades 46 mounted thereon to move relative to the toolbar 48. However, it should be appreciated that, in alternative embodiments, the hanger(s) 58 may have any other suitable configuration.

Additionally, in accordance with aspects of the present subject matter, the system 80 may include one or more motion sensors 60 configured to detect the motion of one or more components of the disc gang assembly 44 as the implement 10 is being moved across the field and transmit associated motion data to the corresponding system controller 82 (such as via one or more communicative links 84 omitted for clarity). In one embodiment, the motion sensor(s) 60 may correspond to an accelerometer configured to detect the acceleration or vibration of a component(s) of the disc gang assembly 44 as the disc blades 44 are being pulled through the ground. Additionally, in one embodiment, the motion sensor(s) 60 may be configured to detect the motion of the component(s) of the disc gang assembly 44 independent from the frame 28 (see FIGS. 1 and 2) of the implement 10. For instance, the motion sensor(s) 60 may be configured to detect local accelerations and/or vibrations of the disc gang assembly 44 that are not transmitted to frame 28 or that do not otherwise result in similar acceleration/vibration of the frame 28.

As shown in FIG. 5, the motion sensor(s) 60 may, in one embodiment, be mounted directly to component(s) of the disc gang assembly 44. For instance, in the illustrated embodiment, the motion sensor(s) 60 is mounted directly to one or more disc blades 46 of the disc gang assembly 44 in order to detect the motion of the disc gang assembly 44. In another embodiment, as illustrated, the motion sensor(s) 60 may be mounted to the disc gang shaft 56 of the disc gang assembly 44 in order to detect the motion of the disc gang assembly 44. In a still further embodiment, the motion sensor(s) 60 may be mounted to the toolbar 48 in order to detect the motion of the disc gang assembly 44. In additional embodiments, as further illustrated in FIG. 5, the motion sensor(s) 60 may be mounted on a hanger 58 coupled between the toolbar 48 and the disc blades 46. It should be appreciated that FIG. 5 provides examples of various different locations for mounting motion sensors 60 on a disc gang assembly 44. One of ordinary skill in the art will readily appreciate that the system 80 need not include each of the motion sensors 60 shown in FIG. 5. For instance, embodiments of the disclosed system 80 may only include one of the motion sensors 60 shown in FIG. 5.

Moreover, as indicated above, the system 80 may also include one or more orientation sensors 66 configured to detect the relative orientation of the disc gang assembly 44, such as the orientation of the disc gang assembly 44 relative to the implement frame 28 (see, e.g., FIGS. 1 and 2) and/or the orientation of the gang disc assembly 44 relative to any other suitable reference location (e.g., the ground), and transmit associated orientation data to the corresponding system controller 82. In several embodiments, each orientation sensor 66 may be configured as one or more gyroscopes and/or IMOs coupled to the disc gang assembly 44. For instance, as shown in FIG. 5, an orientation sensor 66 (e.g., a gyroscope or IMO) may be coupled to the toolbar 48 of the disc gang assembly 44 to allow the orientation of the disc gang assembly 44 to be monitored. In such an embodiment, the toolbar-mounted sensor 66 may allow for orientation of the disc gang assembly 44 to be monitored relative to a predetermined reference orientation defined independent of the implement frame 28, such as an orientation defined relative to the direction of gravity.

In a further embodiment, as illustrated, an orientation sensor 66 (e.g., a gyroscope or IMO) may be coupled to the gang disc shaft 56 of the disc gang assembly 44 to allow for the orientation of the disc gang assembly 44 to be monitored. In such an embodiment, the shaft-mounted sensor 66 may allow for orientation of the disc gang assembly 44 to be monitored relative to the predetermined reference orientation defined independent of the implement frame 28, such as the orientation defined relative to the direction of gravity. As further illustrated in FIG. 5, in another embodiment an orientation sensor 66 may be mounted on the hanger 58 of the disc gang assembly 44 to allow for the orientation of the disc gang assembly 44 to be monitored. In such an embodiment, the hanger-mounted sensor 66 may allow for orientation of the disc gang assembly 44 to be monitored relative to the predetermined reference orientation defined independent of the implement frame 28, such as the orientation defined relative to the direction of gravity. It should be appreciated that, in certain embodiments, both the motion sensor(s) 60 and the orientation sensor 66 may be coupled to one or more of the hangers 58.

In addition to monitoring the gang disc assembly 44 orientation relative to a predetermined reference orientation, the orientation sensor(s) 66 may also allow the relative orientation between the disc gang assembly 44 and the frame 28 to be monitored. For instance, as shown in regards to FIGS. 1 and 2, a separate, second orientation sensor 70 may be mounted to a portion of the frame 28, such as a structural frame member 38. In certain embodiments, the second orientation sensor 70 may be a gyroscope and/or IMO mounted to a portion of the frame 28. In such an embodiment, by monitoring the orientation data provided by both the orientation sensor(s) 66 and the frame-mounted orientation sensor 70, the controller 82 may be configured to determine the orientation of the gang disc assembly 44 relative to the frame 28.

When executing the embodiment of the system 80 shown in FIG. 5, the controller 82 may be configured to determine an indication of the seedbed quality at a given location within the field based on the detected motion of the gang disc assembly 44 communicated from the motion sensor(s) 60 and the detected relative orientation of the gang disc assembly 44 communicated from the orientation sensors(s) 66 as the implement 10 is being moved across the. Additionally, as indicated above, in one embodiment, the controller 82 may be configured to further determine the indication of the seedbed quality at the given location within the field based on the speed of the agricultural implement 10. For example, a speed sensor(s) 71 (see, FIGS. 1 and 2) may communicate data indicative of the speed of the agricultural implement 10 at the given location within the field associated. The controller 82 may then utilize the data derived from the sensors 60, 66, 71 (e.g., the detected motion of the component(s) of the disc gang assembly 44, the detected relative orientation of the component(s) of the disc gang assembly 44 to the ground and/or the frame 28 of the implement 10, and/or the speed of the agricultural implement 10) as inputs into a mathematical expression, a look-up table, and/or the like as described above with reference to FIG. 3 to allow the seedbed quality to be monitored.

Although certain combinations of measurements are illustrated here for exemplary purposes, it should be appreciated that the controller 82 may be configured to determine the soil condition based on the measurements communicated from any two or more of the sensors 60, 66, 68, 70, 71. For example, the controller 82 may be configured to determine the soil condition based on each of the measurements communicated from the sensors 60, 66, 68, 70, 71.

Figure 6:
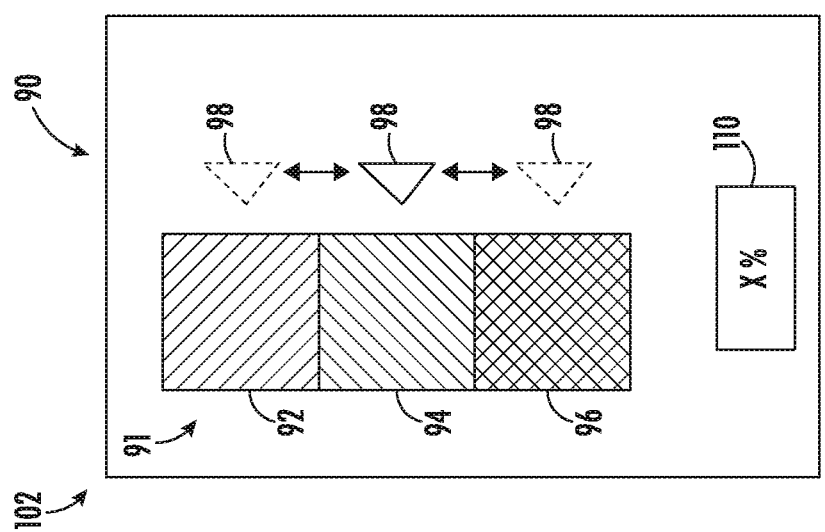
FIG. 6 illustrates one embodiment of an example interface element for displaying an indication of the monitored soil condition in accordance with aspects of the present subject matter, particularly illustrating the interface element displayed on a user interface.

Referring now to FIG. 6, an example view of one embodiment of a display element or interface element 90 that may be presented to an operator on the user interface 102 of the disclosed system 80 as a visual indicator of the soil condition being monitored is illustrated in accordance with aspects of the present subject matter. It should be appreciated that, when providing the operator of an agricultural implements 10 with a visual indication of the seedbed quality, numerous different display or interface elements 90 may be utilized. However, in general, it is typically desirable to use an interface element 90 that expresses the seedbed quality in terms easy for the operator to understand to allow the operator to quickly assess the performance of the implement 10 and make adjustments if necessary.

For instance, as shown in FIG. 6, in certain embodiments, the interface element 90 may include a color coded element, such as a color-coded bar 91. In such an embodiment, a positive indicator 92 (represented by cross-hatches extending from the top left to the bottom right) may be displayed on the color-coded bar 91 to indicate an optical or good seedbed floor condition. For example, the positive indicator 92 may be backlit with a green light. Further, an intermediate indicator 94 (represented by cross-hatches extending from the top right to the bottom left) may be displayed on the color-coded bar 91 to indicate an intermediate or medium-level seedbed floor condition. For instance, the intermediate indicator 92 may be backlit with a yellow light. Additionally, a negative indicator 96 (represented by intersecting cross-hatches) may be displayed on the color-coded bar 91 to indicate a poor or negative seedbed floor condition. For example, the negative indicator 94 may be backlit with a red light. In certain embodiments, the interface element 90 may also include a sliding scale 98 operable to move between the indicators 92, 94, 96 to represent the seedbed floor condition with increased granularity. In addition to such visual indicators (or as an alternative thereto), the interface element 90 may include a percentage indicator 110 configured to display a percentage value representative of the seedbed quality (e.g., 100% representing an optimal seedbed floor condition and 0% representing a poor seedbed floor condition.

Figure 7:
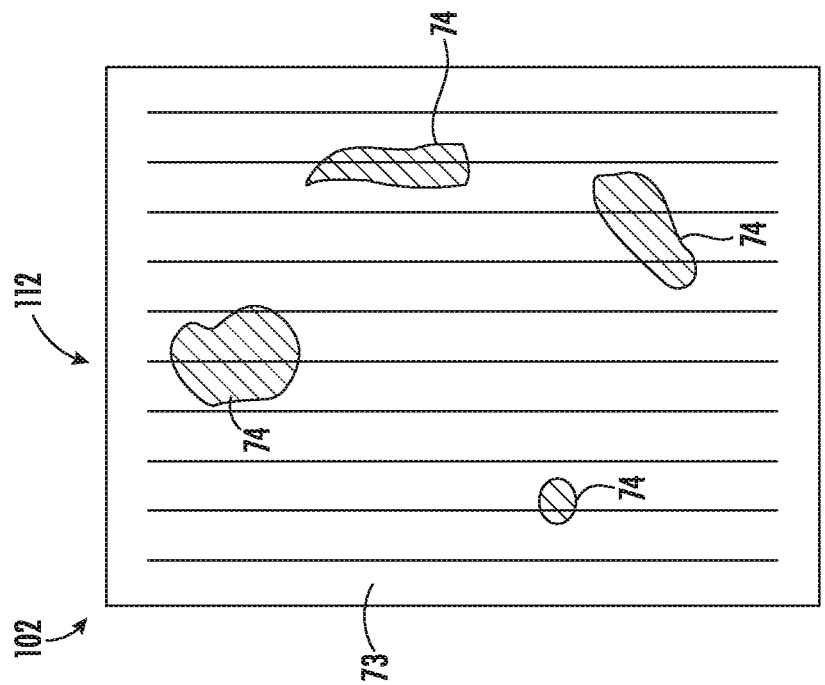
FIG. 7 illustrates one embodiment of an example field map with geographical coordinates in accordance with aspects of the present subject matter, particularly illustrating the field map with geographical coordinates displayed on the user interface.

Referring now to FIG. 7, an example view of one embodiment of a field map 112 that may be generated by the system controller 82 and subsequently display to the operator (e.g., on the associated user interface 102) is illustrated in accordance with aspects of the present subject matter. As indicated above, the controller 82 may be configured to geo-reference or geo-locate the data received from the motion and orientation sensors 60, 66, 70 as the implement 10 is moved across a field based on the location data received from the associated location sensor(s) 68 provided in association with the implement 10 and/or the work vehicle 12. For instance, the location sensor(s) 68 may include a GPS receiver separate from the motion sensor 60. Further, the location sensor(s) 68 may be positioned in close proximity to the motion sensor 60, e.g., on the implement 10, or may be positioned on the work vehicle 12. As such, the controller 82 may similarly be configured to geo-reference or geo-locate the soil condition (e.g., seedbed quality) determined based on the sensor data collected at various different locations within the field. For instance, the controller 82 may utilize the sensor data collected from the location sensor(s) 68 in combination with an output from the look-up table, as an input in the data fusion and/or sensor fusion algorithm, or in combination with the output of the data fusion and/or sensor fusion algorithm as described in regards to FIG. 3. In such an embodiment, the controller 82 may use the geo-referenced data to generate a field map 112 with geographical coordinates (e.g., similar to the one shown in FIG. 7) that maps the monitored soil condition at the various different locations within the field. As shown in FIG. 7, the field map 112 with geographical coordinates may, for example, include a number of passes 113 representative of the different locations within the field across which the implement 10 was moved. As shown in FIG. 7, the field map 112 with geographical coordinates may be used to provide a visual indication to the operator of the soil condition being monitored. For example, the field map 112 with geographical coordinates may distinguish areas within the field at which seedbed quality is poor (e.g., areas 74) from different areas within the field at which the seedbed quality is desirable (e.g., area 73).

Figure 8:
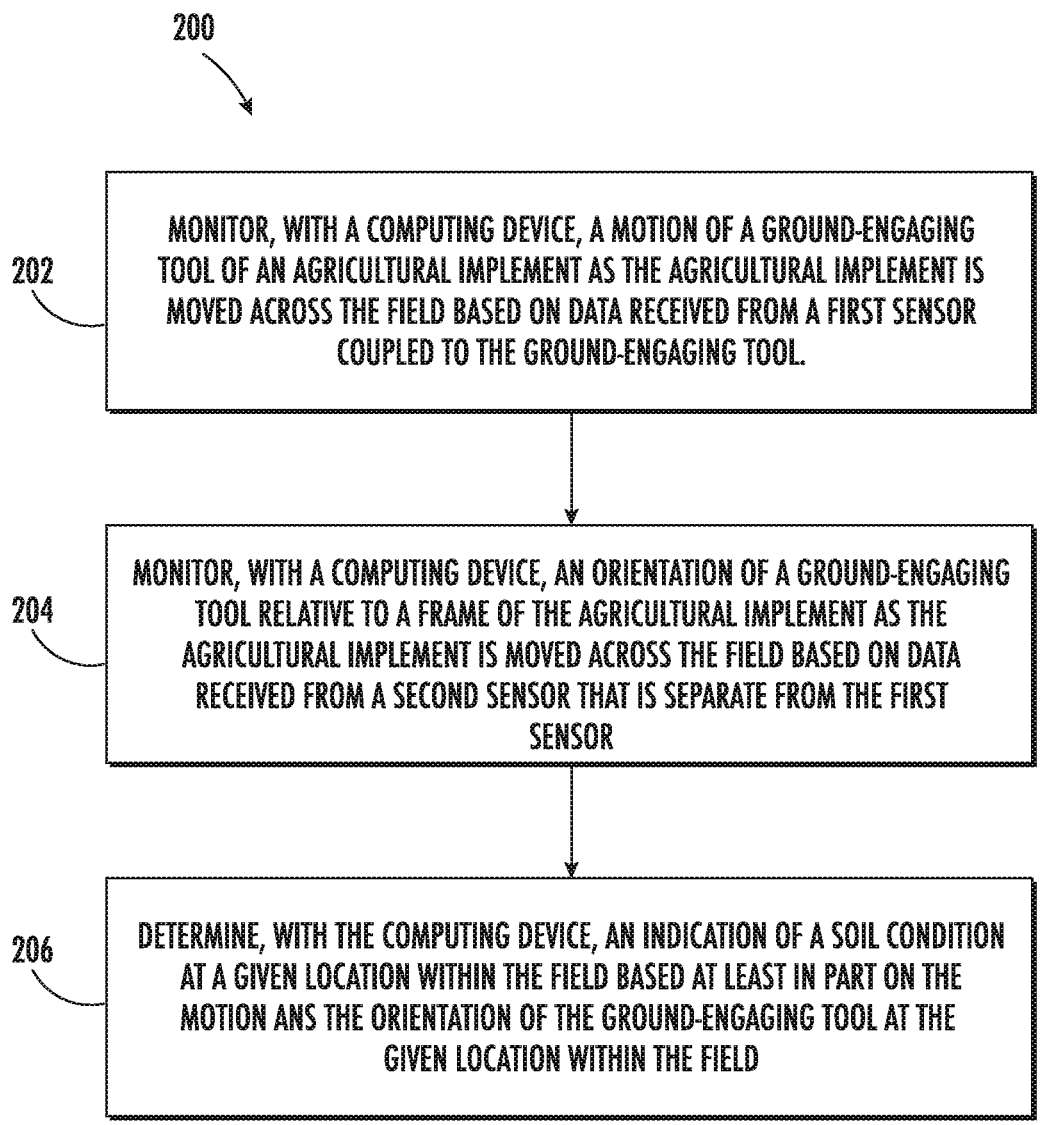
FIG. 8 illustrates a flow diagram of one embodiment of a method of monitoring soil conditions within a field in accordance with aspects of the present subject matter.

Referring now to FIG. 8, a flow diagram of one embodiment of a method 200 of monitoring soil conditions within a field is depicted in accordance with aspects of the present subject matter. In general, the method 200 will be described herein with reference to the implement 10 and the system 80 described above with reference to FIGS. 1-4, 6, and 7. However, it should be appreciated by those of ordinary skill in the art that the disclosed method 200 may generally be utilized to determine the soil condition of a field in connection with any agricultural implement having any suitable implement configuration and/or any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include monitoring, with a computing device, a motion of a ground-engaging tool of an agricultural implement 10 as the agricultural implement 10 is moved across the field based on data received from a first sensor coupled to the ground-engaging tool. For instance, as indicated above, the system controller 82 may be configured to monitor the motion of one or more ground-engaging tools (e.g., the shanks 50 and/or the discs 46) based on sensor data received from one or more motion sensors 60.

At (204), the method 200 may include monitoring, with the computing device, an orientation of the ground-engaging tool relative to a frame 28 of the agricultural implement 10 as the agricultural implement 10 is moved across the field based on data received from a second sensor that is separate from the first sensor. For instance, as indicated above, the system controller 82 may be configured to monitor the orientation of one or more of the ground-engaging tools of the implement 10 based on sensor data received from one or more orientation sensors 66.

Moreover, as shown in FIG. 8, at (206), the method 200 may include determining, with the computing device, an indication of a soil condition at a given location within the field based at least in part on the motion and the orientation of the ground-engaging tool at the given location within the field. Specifically, as indicated above, the system controller 82 may be configured to analyze the motion/orientation data received from the sensors to determine a soil condition (e.g., seedbed quality) at one or more locations within the field. In doing so, the system controller 82 may, in certain embodiments, also take into account the speed of the implement 10 (e.g., as determined based on data received from a sensor sensor(s) when analyzing or interpreting the sensor data.

Figure 9:
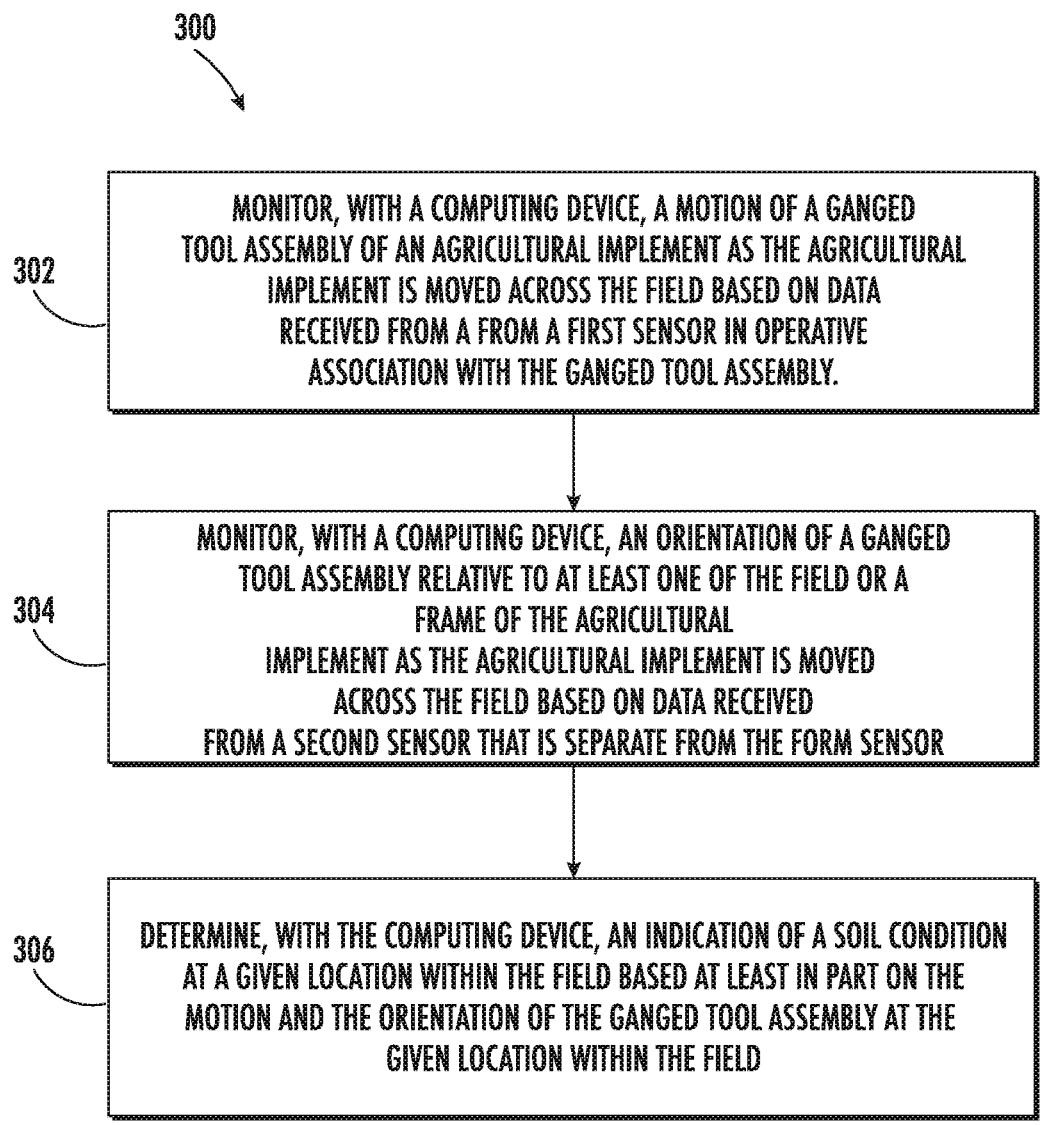
FIG. 9 illustrates a flow diagram of another embodiment of a method of monitoring soil conditions within a field in accordance with aspects of the present subject matter.

Referring now to FIG. 9, a flow diagram of another embodiment of a method 300 of monitoring soil conditions within a field is depicted in accordance with aspects of the present subject matter. In general, the method 300 will be described herein with reference to the implement 10 and the system 80 described above with reference to FIGS. 1-2, 3, and 7-9. However, it should be appreciated by those of ordinary skill in the art that the disclosed method 300 may generally be utilized to determine the soil condition of a field in connection with any agricultural implement having any suitable implement configuration and/or any system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 may include monitoring, with a computing device, a motion of a ganged tool assembly of an agricultural implement 10 as the agricultural implement 10 is moved across the field based on data received from a first sensor in operative association with the ganged tool assembly. For instance, as indicated above, the system controller 82 may be configured to monitor the motion of one or more components of the disc gang assembly 44 based on sensor data received from one or more motion sensors 60.

At (304), the method 300 may include monitoring, with the computing device, an orientation of the ganged tool assembly relative to the field and/or a frame 28 of the agricultural implement 10 as the agricultural implement 10 is moved across the field based on data received from a second sensor that is separate from the first sensor. For instance, as indicated above, the system controller 82 may be configured to monitor the orientation of one or more of the components of the disc gang assembly 44 based on sensor data received from one or more orientation sensors 66.

Moreover, as shown in FIG. 9, at (306), the method 300 may include determining, with the computing device, an indication of a soil condition at a given location within the field based at least in part on the motion and the orientation of the ganged tool assembly at the given location within the field. Specifically, as indicated above, the system controller 82 may be configured to analyze the motion/orientation data received from the sensors to determine a soil condition (e.g., seedbed quality) at one or more locations within the field. In doing so, the system controller 82 may, in certain embodiments, also take into account the speed of the implement 10 (e.g., as determined based on data received from a sensor(s) when analyzing or interpreting the sensor data.

It is to be understood that the steps of the methods 200, 300 are performed by the controller 82 upon loading and executing software code or instructions which are tangibly stored on a tangible computer readable medium, such as on a magnetic medium. e.g., a computer hard drive, an optical medium, e.g., an optical disc, solid-state memory, e.g., flash memory, or other storage media known in the art. Thus, any of the functionality performed by the controller 82 described herein, such as the methods 200, 300, is implemented in software code or instructions which are tangibly stored on a tangible computer readable medium. The controller 82 loads the software code or instructions via a direct interface with the computer readable medium or via a wired and/or wireless network. Upon loading and executing such software code or instructions by the controller 82, the controller 82 may perform any of the functionality of the controller 82 described herein, including any steps of the method(s) 200, 300 described herein.

The term "software code" or "code" used herein refers to any instructions or set of instructions that influence the operation of a computer or controller. The) may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring soil conditions within a field, the system comprising:
    an agricultural implement including a frame and a ground-engaging tool coupled to the frame;
    a first sensor coupled to the ground-engaging tool and configured to detect motion of the ground-engaging tool as the agricultural implement is moved across the field;
    a second sensor separate from the first sensor, the second sensor configured to detect an orientation of the ground-engaging tool relative to the frame as the agricultural implement is moved across the field;
    a controller communicatively coupled to the first and second sensors, the controller configured to determine an indication of a seedbed floor condition at a given location within the field based at least in part on the detected motion and the detected orientation of the ground-engaging tool at the given location within the field; and
    a third sensor communicatively coupled to the controller and configured to provide data indicative of a speed of the agricultural implement as the agricultural implement is moved across the field, the controller being configured to determine the indication of the seedbed floor condition at the given location within the field based at least in part on the detected motion and detected orientation of the ground-engaging tool and the speed of the agricultural implement at the given location within the field.

2. The system of claim 1, wherein the seedbed floor condition-comprises a roughness or levelness of a seedbed floor of the field, and wherein the ground-engaging tool comprises a ground penetrating tool configured to engage or create the seedbed floor as the agricultural implement is moved across the field.

3. The system of claim 1, wherein the first sensor detects motion of the ground-engaging tool independent from the frame.

4. The system of claim 1, wherein the first sensor comprises an accelerometer configured to detect the motion of the ground-engaging tool.

5. The system of claim 4, wherein the accelerometer is mounted directly to a portion of the ground-engaging tool.

6. The system of claim 1, wherein the second sensor comprises at least one of a gyroscope or inertia motion unit coupled to one of the ground-engaging tool or a toolbar coupled between the ground-engaging tool and the frame.

7. The system of claim 1, wherein the second sensor comprises an encoder coupled between the ground-engaging tool and the frame adjacent to a pivot point defined between the ground-engaging tool and the frame.

8. The system of claim 1, wherein the controller is configured to generate an interface element for display to an operator on a user interface, the interface element associated with a visual indicator of the seedbed floor condition.

9. The system of claim 1, wherein the controller is configured to determine the indication of the seedbed floor condition at a plurality of different locations within the field, the controller being configured to generate a field map with geographical coordinates that maps the seedbed floor condition at the plurality of different locations within the field.

10. A method of monitoring soil conditions within a field, the method comprising:

monitoring, with a computing device, a motion of a ground-engaging tool of an agricultural implement as the agricultural implement is moved across the field based on data received from a first sensor coupled to the ground-engaging tool;

monitoring, with the computing device, an orientation of the ground-engaging tool relative to a frame of the agricultural implement as the agricultural implement is moved across the field based on data received from a second sensor that is separate from the first sensor;

determining, with the computing device, an indication of a seedbed floor condition at a given location within the field based at least in part on the motion and the orientation of the ground-engaging tool at the given location within the field; and monitoring, with the computing device, a speed of the agricultural implement as the agricultural implement is moved across the field based on data received from a third sensor separate from the first and second sensors, wherein determining the indication of the seedbed floor condition at the given location within the field comprises determining the indication of the seedbed floor condition at the given location within the field based at least in part on the motion and orientation of the ground-engaging tool and the speed of the agricultural implement at the given location within the field.

11. The method of claim 10, wherein the seedbed floor condition comprises a roughness or levelness of a seedbed floor of the field, and wherein the ground-engaging tool comprises at least one of a shank or disc of the agricultural implement.

12. The method of claim 10, wherein monitoring the motion of the ground-engaging tool comprises monitoring the motion of the ground-engaging tool independent of the frame of the agricultural implement.

13. The method of claim 10, wherein the first sensor comprises an accelerometer mounted directly to a portion of the ground-engaging tool, and wherein monitoring the motion of the ground-engaging tool comprises detecting the motion of the ground-engaging tool based on data received from the accelerometer.

14. The method of claim 10, further comprising:
generating, with the computing device, a field map with geographical coordinates that maps the seedbed floor condition at a plurality of different locations within the field.

15. The method of claim 10, further comprising:
generating, with the computing device, an interface element for display to an operator on a user interface, the interface element associated with a visual indicator of the seedbed floor condition.

16. A system for monitoring soil conditions within a field, the system comprising:

an agricultural implement including a frame and a ground-engaging tool coupled to the frame;

a first sensor coupled to the ground-engaging tool and configured to detect motion of the ground-engaging tool as the agricultural implement is moved across the field;

a second sensor separate from the first sensor, the second sensor comprising a rotary sensor coupled between the ground-engaging tool and the frame and being configured to detect an orientation of the ground-engaging tool relative to the frame as the agricultural implement is moved across the field;

a controller communicatively coupled to the first and second sensors, the controller configured to determine an indication of a soil condition at a given location within the field based at least in part on the detected motion and the detected orientation of the ground-engaging tool at the given location within the field; and a third sensor communicatively coupled to the controller and configured to provide data indicative of a speed of the agricultural implement as the agricultural implement is moved across the field.

17. The system of claim 16, wherein the soil condition comprises a roughness or a levelness of a seedbed floor of the field, and wherein the ground-engaging tool comprises a ground penetrating tool configured to engage or create the seedbed floor as the agricultural implement is moved across the field.

18. The system of claim 16, wherein the rotary sensor comprises an encoder coupled between the ground-engaging tool and the frame adjacent to a pivot point defined between the ground-engaging tool and the frame.

* * * * *